(12) United States Patent
Remus et al.

(10) Patent No.: US 8,381,757 B2
(45) Date of Patent: Feb. 26, 2013

(54) VALVE DEVICE

(75) Inventors: Kai Remus, Ottweiler (DE); Frank Herold, Saarbrücken (DE); Franz Fuchshumer, Spiesen-Elversborg (DE)

(73) Assignee: Hydac Electronic GmbH, Saarbrucken (DE)

( * ) Notice: Subject to any disclaimer, the term of this patent is extended or adjusted under 35 U.S.C. 154(b) by 185 days.

(21) Appl. No.: 12/735,116

(22) PCT Filed: Nov. 4, 2008

(86) PCT No.: PCT/EP2008/009266
§ 371 (c)(1),
(2), (4) Date: Jun. 17, 2010

(87) PCT Pub. No.: WO2009/080143
PCT Pub. Date: Jul. 2, 2009

(65) Prior Publication Data
US 2010/0308239 A1 Dec. 9, 2010

(30) Foreign Application Priority Data

Dec. 24, 2007 (DE) .......................... 10 2007 062 649

(51) Int. Cl.
*G05D 11/13* (2006.01)
(52) U.S. Cl. ......... 137/118.02; 137/118.04; 137/601.18; 137/625.3; 137/269; 60/484; 91/517
(58) Field of Classification Search ............. 137/118.02, 137/118.04, 601.14, 601.18, 269, 625.14, 137/625.3; 60/422, 420, 484; 91/436, 517
See application file for complete search history.

(56) References Cited

U.S. PATENT DOCUMENTS

| | | | | |
|---|---|---|---|---|
| 3,618,628 A | * | 11/1971 | Kramer | 137/71 |
| 3,703,186 A | * | 11/1972 | Brewer | 137/101 |
| 3,841,095 A | * | 10/1974 | Baker | 60/404 |
| 3,979,908 A | * | 9/1976 | Alderson | 60/422 |
| 4,192,337 A | * | 3/1980 | Alderson et al. | 137/101 |
| 4,541,451 A | * | 9/1985 | Wittren et al. | 137/118.06 |
| 4,966,066 A | * | 10/1990 | Kauss et al. | 91/516 |

(Continued)

FOREIGN PATENT DOCUMENTS

| | | |
|---|---|---|
| DE | 37 07 698 A1 | 9/1987 |
| DE | 39 38 560 A1 | 5/1991 |

(Continued)

OTHER PUBLICATIONS

Heinrich W. Nikolaus, "Loadsensing—lastunabhängige Dosierung von Verbraucherströmen", O & P Ölhydraulik und Pneumatik, Vereinigte Fachverlage, Mainz, DE, vol. 38, Apr. 1, 1994, pp. 196, 199-201, XP000195271, ISSN: 0341-2660, figures 6, 7.

*Primary Examiner* — John Rivell
*Assistant Examiner* — Minh Le
(74) *Attorney, Agent, or Firm* — Roylance, Abrams, Berdo & Goodman L.L.P.

(57) ABSTRACT

A valve device for a hydraulic circuit (10) divides the incoming volume flow into at least two pre-determined partial flows for supplying hydraulic consumers ($V_1$, $V_2$) of the circuit (10) and has at least one pressure balance (16) and at least one orifice. Since the orifice is embodied as a variable orifice (32) controllable by a proportional magnet (34), the opening area of the orifice varies. A flow regulator is then realized and can switch the regulated volume flow and/or proportionally adjust the regulated volume flow in a defined manner.

6 Claims, 5 Drawing Sheets

U.S. PATENT DOCUMENTS

| | | | |
|---|---|---|---|
| 5,209,063 A * | 5/1993 | Shirai et al. | 60/422 |
| 5,271,227 A * | 12/1993 | Akiyama et al. | 60/422 |
| 5,273,069 A * | 12/1993 | Akiyama et al. | 137/596 |
| 5,279,122 A * | 1/1994 | Shirai et al. | 60/452 |
| 5,535,663 A * | 7/1996 | Yamashita et al. | 91/517 |
| 5,782,260 A | 7/1998 | Jacobs et al. | |
| 5,845,678 A * | 12/1998 | Ishihama et al. | 137/596 |
| 6,209,322 B1 * | 4/2001 | Yoshida et al. | 60/452 |
| 6,367,365 B1 * | 4/2002 | Weickert et al. | 91/447 |
| 6,422,009 B1 * | 7/2002 | Nozawa et al. | 60/447 |
| 7,013,913 B2 * | 3/2006 | Kuromusha et al. | 137/501 |
| 7,434,393 B2 * | 10/2008 | Hesse | 60/422 |
| 2007/0006580 A1 * | 1/2007 | Hesse | 60/452 |

FOREIGN PATENT DOCUMENTS

| | | |
|---|---|---|
| DE | 199 23 345 A1 | 11/2000 |
| DE | 102 02 607 C1 | 7/2003 |
| DE | 10 2006 004 264 A1 | 8/2007 |
| EP | 0 750 241 A2 | 12/1996 |
| EP | 1 035 332 A1 | 9/2000 |

\* cited by examiner

VALVE DEVICE

FIELD OF THE INVENTION

The invention relates to a valve device for a hydraulic circuit which divides the incoming volumetric flow into at least two predetermined partial flows for the supply of hydraulic consumers of the circuit. The valve device has at least one pressure compensator and at least one orifice.

BACKGROUND OF THE INVENTION

These valve devices are also technically referred to as flow regulators or pressure-compensated flow control valves and allow the incoming volumetric flow to be divided into a regulated and an unregulated residual volumetric flow according to the throttle principle. Ultimately, they are throttle valves with an adjustable orifice (throttle) in which the flow rate remains constant, regardless of changing load pressures, by a combination with a respective pressure compensator. At the same time, the pressure compensator clears a changing cross section that is inversely proportional to the load pressure so that consequently the flow rate remains essentially constant, regardless of the load pressure.

Such a valve device is shown, for example, in DE 10 2006 004 264 A1, relating to a stabilization means or mechanism for a multi-axle vehicle with one hydraulic control circuit each provided for the front and the rear axles. Because in the known solution the incoming volumetric flow of at least one of the axles is controlled by the pressure-compensated flow control valve, and because at a higher capacity of the supply unit, the accompanying excess of volumetric flow can be relayed to at least one of the other axles which is unregulated, in case of an excess of the volumetric flow, the flow is kept constant on the axle controlled by the flow control valve. The excess portion travels to the respective unregulated axle. Among other things, this system causes the desired roll stabilization on the unregulated axle in terms of trigger behavior to be designed to be more highly dynamic. Under actual driving conditions, this operation confers distinct advantages compared to otherwise conventional divisions of amounts with percentage volumetric ratios that are stipulated in a defined manner for the respective partial flow amounts for the supply of the hydraulic consumers in the form of the control circuit for the indicated front and rear axles.

SUMMARY OF THE INVENTION

An object of the invention is to provide a valve device, regardless of how high the power demand is for the respective partial flow of the hydraulic circuit, that supplies the necessary amount of fluid the consumer needs to ensure the power demand for a safety-relevant system of the hydraulic circuit.

This object is basically achieved by a valve device having an orifice outfitted as a variable orifice triggerable by a proportional magnet. Its opening area then can be changed to implement a type of flow regulator switching and/or proportionally setting the controlled volumetric flow in a defined manner. This function is required, in particular, when at least two hydraulic systems are operated with hydraulic consumers that are different in terms of power demand by only one hydraulic pump as a pressure supply source. Their power demand can be at least in part very different. At the same time, one of the two systems comprises the safety-relevant system which must be supplied under all conditions.

Due to the variable orifice implemented by triggering with a proportional magnet, a proportionally variable opening area arises and is made such that for all trigger states a defined passage area remains opened. In any case, the flow through the orifice meets the power demand for the safety-relevant system. Even in the case of a fault, for example, the power for the proportional magnet as a trigger fails, a maximally regulated volumetric flow is supplied to the safety-relevant system and its operation is guaranteed.

The valve device according to the invention designed as a variable pressure-compensated flow control valve, is especially advantageous when used in vehicles of any type (passenger cars, busses, trucks, roadworthy machinery, etc.) where a hydraulic pump driven by the vehicle engine as a pressure supply source supplies both the servo-assisted steering and the roll stabilization for the axles of the vehicles.

For the associated power demands on the individual systems, this ability means the following based on practical circumstances.

When the vehicle is driving at speed, only very little steering deflection (speed) is necessary on the part of the operator, and little servo assistance is necessary. In this case, the volumetric flow in the steering circuit can be ramped down to a minimum value, while at the same time greater roll moments must be corrected. Conversely, when parking, for example, a large steering deflection (speed) with correspondingly high servo assistance is necessary, and roll compensation is less important when parking. For both system requirements, there should never be too little volumetric flow for the steering since otherwise the servo assistance for the steering deflection will fail. Modern vehicles are very difficult to manage with normal expenditure of force without the pertinent servo assistance. With the invention, for this application it is always ensured that steering does not receive too little volumetric flow relative to the indicated servo assistance.

It must also be ensured, in case of a fault, that, for a minimally regulated volumetric flow, servo assistance benefits the steering system. Furthermore, when the power fails, as another possible fault source for the proportional magnet, the magnet should then set the largest opening area on the orifice for the largest regulated volumetric flow available for steering.

Regardless of the described application, the valve device according to the invention can always be used wherever different partial flows of a hydraulic circuit must be set with connected hydraulic consumers having different power requirements and/or which, especially for safety reasons, are not to be supplied beforehand.

In this application, the expression "orifices" is also intended to describe and to cover the use of "throttles." This usage also applies to the term "metering orifice" used technically below. To the extent that the expression "orifice," "variable orifice," "free orifice cross sections," etc. are used, these terms generally include the terms "throttle," "variable throttle," "free throttle cross-sectional area," etc.

In one especially preferred embodiment of the valve device according to the invention, at least the pressure compensator and the respectively used orifices and proportional magnet are components of a common valve block. This common valve block can also be retrofitted on site onto existing vehicle systems as a modular unit.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
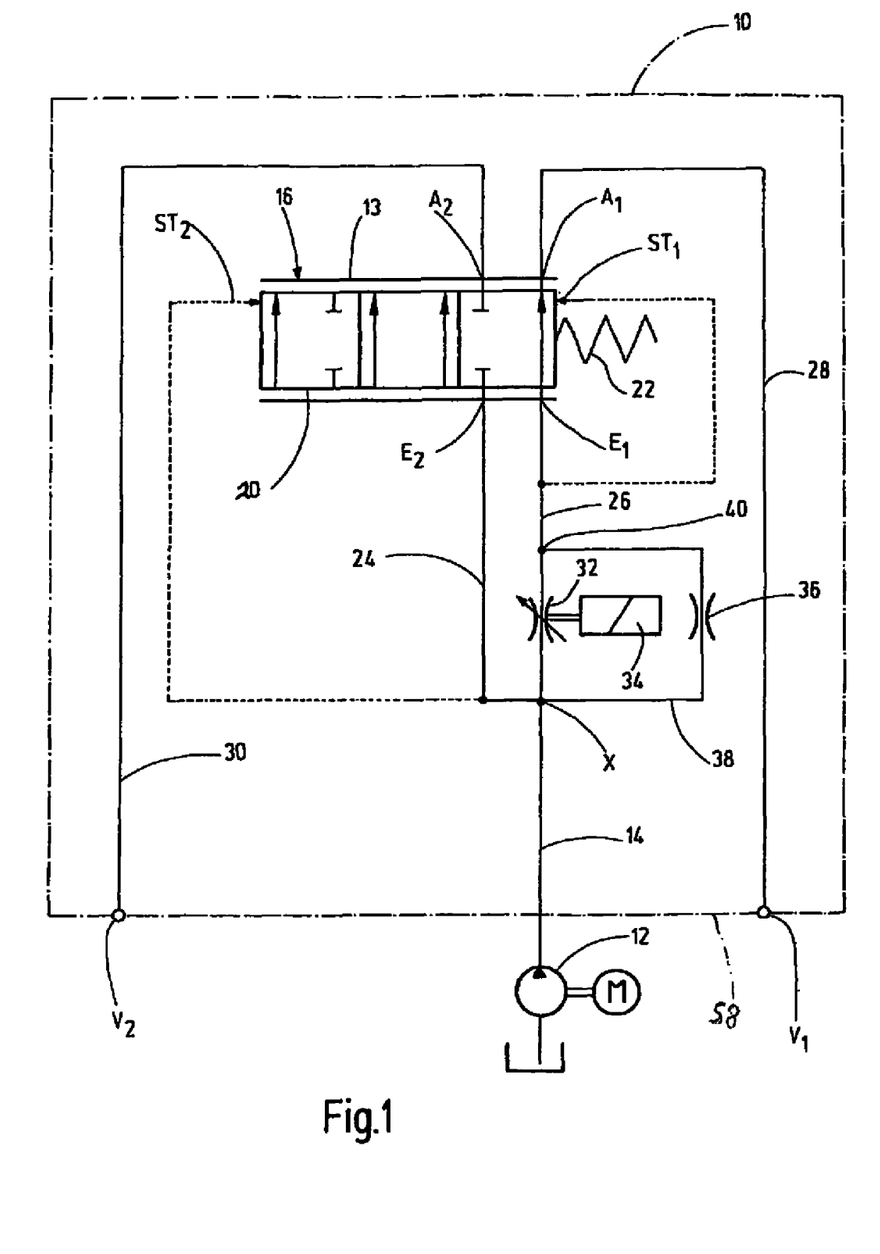
FIG. 1 is a hydraulic circuit diagram of a valve device according to a first exemplary embodiment of the invention.

The valve device shown in FIG. 1 as a hydraulic circuit diagram is used to supply a hydraulic circuit 10 with fluid. The hydraulic circuit 10 is supplied with fluid by a pressure supply source 12. The pressure supply source 12 has a conventional hydraulic pump driven by an engine, for example the internal combustion engine of a motor vehicle. The volumetric fluid flow flowing in via the line 14 from the pressure supply source 12 is divided at the branch site X, one partial flow leading to a hydraulic consumer $V_1$ (not detailed) and the other partial flow to a hydraulic consumer $V_2$. In the specific exemplary embodiment, the consumer $V_1$ is designed to be formed from the servo-assisted steering system, and the consumer $V_2$ forms a roll stabilization system for the axles of the vehicle (not shown).

The valve device has a conventional pressure compensator 16 shown in the non-regulating basic position and forming a 4/3-way proportional valve. The pressure compensator spool 20, guided in the pressure compensator housing 13, is exposed on its opposite sides to control pressures $ST_1$ and $ST_2$ acting in opposite directions. As illustrated in FIG. 1, the pressure compensator spool 20 has its right side supported on an adjusting spring 22 in the manner of a compression spring. One control pressure $ST_2$ is connected to the branch site X, which in turn is connected to the fluid inlet $E_2$ of the pressure compensator 16 to carry fluid via the line 24. The other control pressure $ST_1$ is tapped upstream of the inlet $E_1$ of the pressure compensator 16 in the supplying line 26. Supplying line 26 leads to branch site X. On the opposite side of pressure compensator 16, fluid outlets $A_1$, $A_2$ are connected by lines 28, 30 to the first hydraulic consumer $V_1$ and second consumer $V_2$.

Beginning at the branch site X, a variable orifice 32 is connected in the line 26 and can be triggered by proportional magnet 34, i.e., the free opening area of the variable orifice 32 can be dictated by the proportional magnet 34. Parallel to the variable orifice 32 another orifice 36 is connected as a constant orifice, i.e., the free opening area of the other orifice 36 is constant. The parallel arrangement for the other orifice 36 arises from being connected in a line 38 which, viewed in the fluid direction, discharges upstream of the variable orifice 32 into the line 14 and downstream of the variable orifice 32 into the line 26, specifically, at the connecting site 40. As shown in FIG. 1, the line 38 discharges into the branch site X of the line 14. To obtain the control pressure $ST_1$, the pressure compensator 16 is connected by the control line, indicated by the broken line, to the line 26 between the connecting site 40 and the fluid inlet $E_1$. The fluid pressure prevailing at $E_1$ is then present as the control pressure $ST_1$, and the control pressure $ST_2$ is the fluid pressure on the fluid inlet side $E_2$ of the pressure compensator 16. This control line for the control pressure $ST_2$ is also shown in FIG. 1 by the broken line.

Figure 2:
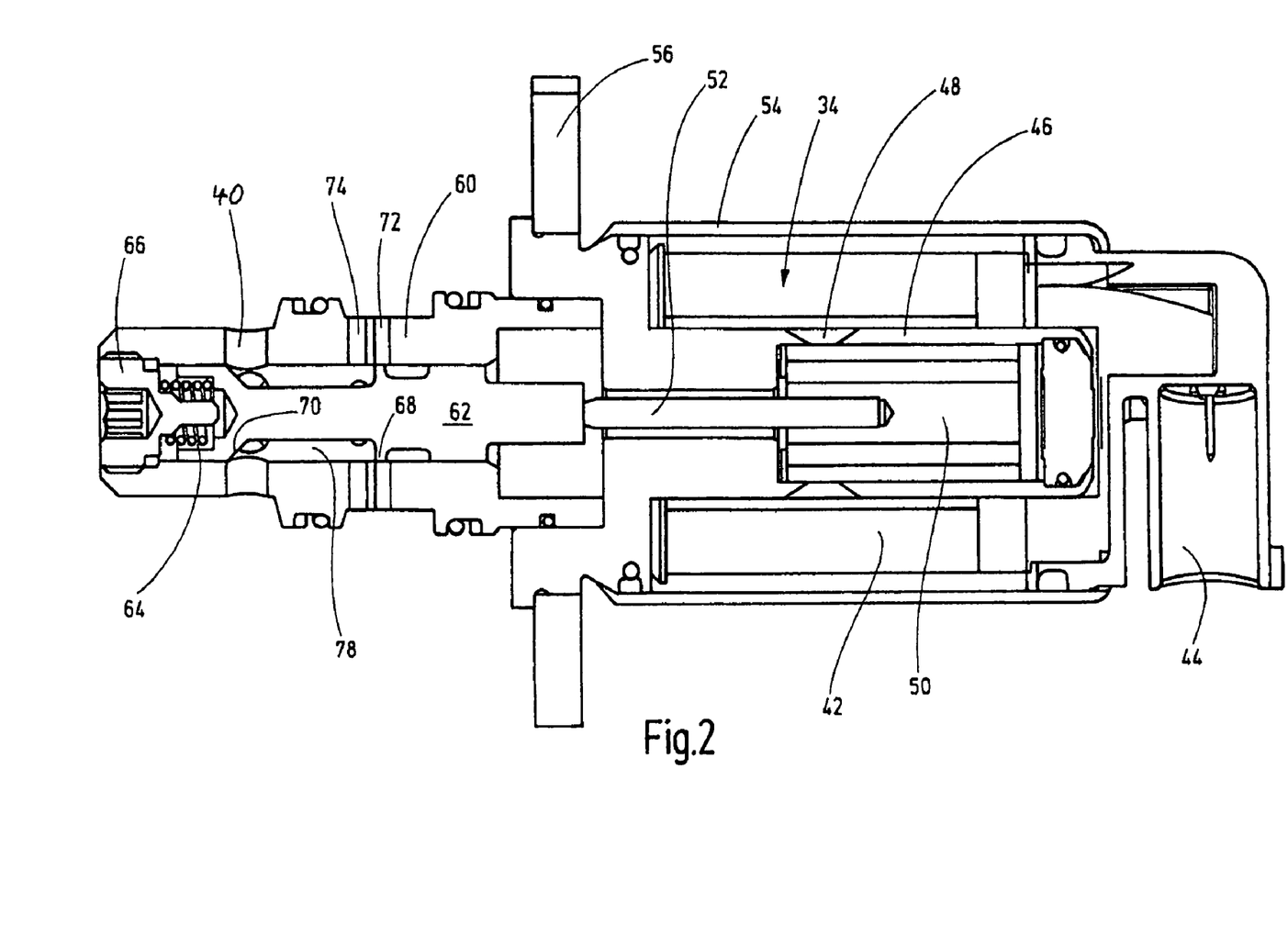
FIG. 2 is a side elevational view in section, without the crosshatching, of the proportional magnet used in the valve device of FIG. 1 with a connected valve housing for implementation of a variable orifice and a constant orifice.

To trigger the whole system, the coil winding 42 of the proportional magnet 34 is connected to a computer unit (not detailed) by an electrical plug contact 44 (cf. FIG. 2). For example, depending on the driving speed of the vehicle, the computer unit dictates the trigger values of the current for the proportional magnet 34. Overall, with the solution as shown in FIG. 1, a valve device in the manner of a flow regulator can proportionally set in a defined manner the regulated partial volumetric flow to the consumer to be regulated. This function is required if, proceeding from the pressure supply source 12, for example two hydraulic systems with a consumer $V_1$ (servo-assisted steering system) and a consumer $V_2$ (roll stabilization system) are operated whose power demands to some extent are distinctly different. At the same time, one of the two systems, specifically the servo-assisted steering system, is a safety-relevant vehicle system and must be supplied with the volumetric flow necessary for safe operation under all conditions. The valve representation as depicted in FIG. 2 shows the energized and therefore connected state for the valve device, yielding a minimum volumetric flow.

Then, in particular, the following applies to the power requirements of the two systems.

When the vehicle is driving at speed, only very little steering deflection (speed) is necessary and little servo assistance is required. In this case, the regulated volumetric flow in the steering circuit can be ramped down for the consumer $V_1$ to a minimum value, induced by the proportional magnet 34 triggerable depending on the speed. In turn, larger roll moments must be corrected, and the consumer $V_2$ acquires a larger residual volumetric flow from the branch site X and the pressure compensator 16. By contrast, when parking, for example, a large steering deflection (speed) with high servo assistance is necessary, so that the hydraulic consumer $V_1$ requires a large partial volumetric flow. Roll compensation is conversely less relevant during parking, so that the fluid volumetric flow required in this respect can be reduced.

For both described states, however, the steering system, i.e., the hydraulic consumer $V_1$, should never receive too little volumetric flow. This requirement is achieved with the valve device shown in FIG. 1. In the case of a fault, i.e., for example when the power fails, the proportional magnet 34 is no longer energized, and the variable orifice 32 will assume its largest opening cross section, i.e., have the largest opening area. The largest regulated volumetric flow will then continue to travel to the servo-assisted steering system (consumer $V_1$).

Figure 5:
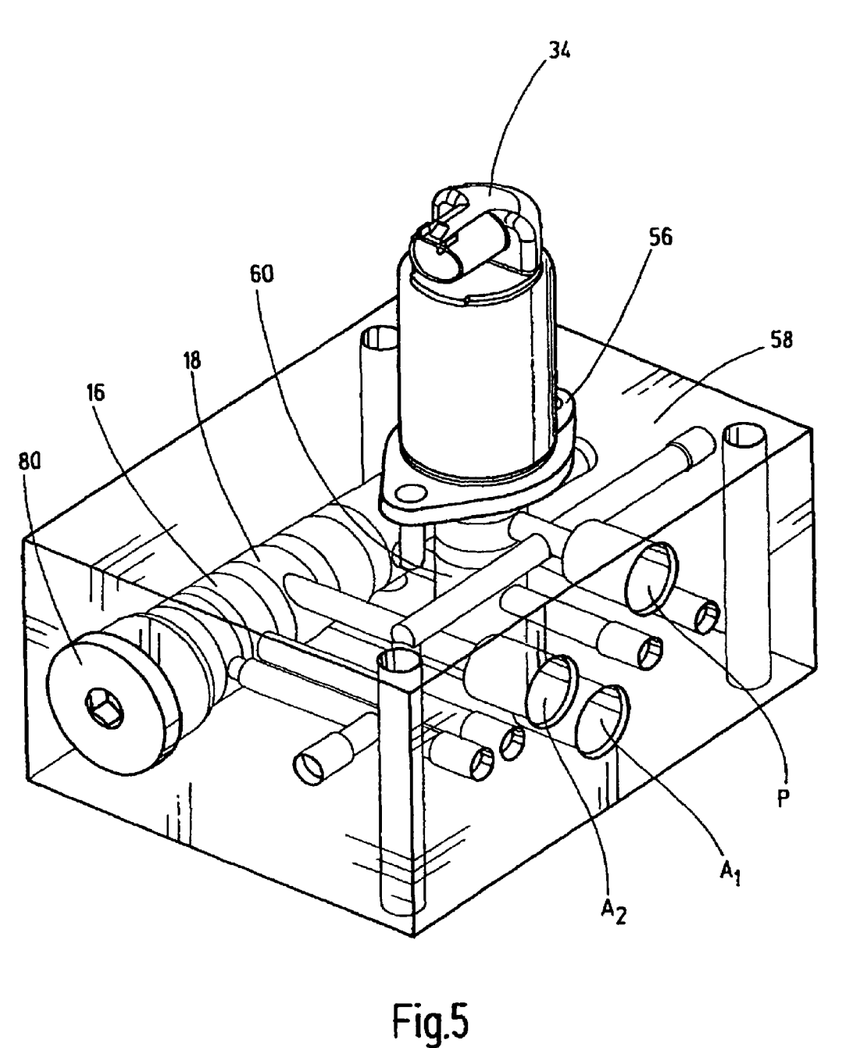
FIG. 5 is a perspective top view of the valve device of FIG. 3 as a whole.

In the valve device according to the invention, the arrangement of the proportional magnet 34 with a variable orifice 32 and constant orifice 36 is detailed below. As already described, the proportional magnet 34 has a coil winding 42 which can be triggered via an electrical plug contact 44 by a computer unit (on-board computer), not shown. The computer unit processes the vehicle-side data, such as, for example, the vehicle speed, steering deflection, etc. In a pole tube arrangement 46 with magnetic separation 48, an armature body 50 with an actuating rod 52 inserted on the end side is guided to be able to move lengthwise. The proportional magnet 34 is made as an attachment part. The magnet housing 54 can be fixed on third components by a flange part 56, for example in the form of a valve block 58 as shown in FIG. 5. By the electrical contact or plug 44, the coil winding 42 can be triggered by the computer unit. Depending on the vehicle speed, the computer unit relays control pulses to the coil winding 42 to advance the armature body 50 with the actuating rod 52. The structure of these proportional magnets 34 is known so that it need not be described further.

The proportional magnet 34 is connected to a valve housing 60 in which a valve spool or control spool 62 is guided. The control spool 62 on its right side, as viewed in FIG. 2, is triggered by the actuating rod 52 and is supported with its other left free end on a support spring 64 in the manner of a compression spring supported in the valve housing 60 by a plug 66. Spring 64 applies a permanent resetting compressive force to the control spool 62. The control spool 62 has an annular widening 68 and has a conically widening control surface 70 on its left free face side.

The surface of widening 68 is used to trigger passage openings 72, 74. The passage openings 72, 74 are made as passage bores, are arranged in succession to one another and preferably diametrically opposite one another, and extend repeatedly through the valve housing 60. Furthermore, the passage openings 72, 74, viewed in each cross-sectional row, can have different diameters and/or a different number of holes. In particular, FIG. 2 shows a first row of bores with passage openings 72, 74 arranged in succession viewed in the direction of travel of the control spool 62, with the first row of passage openings 72 being in concert with the annular widening 68 of the control spool 62 forming the control for the variable volumetric flow portion, and therefore, forming the orifice design for the variable orifice 32. Conversely, the constant orifice 36, located in the bypass and in a parallel connection, is formed by the passage opening 74. The variable orifice 32 is formed by the passage opening 72, and the constant orifice 36 is formed by the passage opening 74.

Depending on the position of the control spool 62, the spool then regulates the variable orifice 32 by the corresponding control edge between the passage opening 72 and the cylindrical constriction 78 in the control spool 62. FIG. 2 also illustrates that, in the event of a power failure and in the event the coil winding 42 is no longer energized, the support spring 64 is relieved and, as viewed in FIG. 2, shifts the control spool 62 to the right. This shifting leads to complete opening of the passage openings 72, 74. Fluid passage is such that a regulated fluid supply is ensured by the connecting site 40 for the partial fluid circuit relating to the consumer $V_1$ in the form of the servo-assisted steering. In this way, a fail-safe circuit is achieved for the valve device according to the invention.

With the valve solution as shown in FIG. 2, a variable metering orifice (throttle) 32 is implemented characterized by triggering with the proportional magnet 34 and consequently with a proportionally variable opening area formed by the passage opening 72. This variable opening area is designed such that for all trigger states a defined area always remains open by the proportional magnet 34. Here, it would be fundamentally sufficient in one basic version to provide only one row of passage openings 72 for fluid passage from the outside to the inside, where, to limit the stroke of the control spool 62, at least part of the hole diameter which is active must then remain free.

As shown in practice, with only one row of bores which are only partially closed, exact adjustment of the volumetric flow in the energized end position of the magnet 34 is difficult to ensure. In particular, tolerances cannot be allowed in production and mounting. Conversely, a reliable and durable system can be achieved with an arrangement in which, in addition to the proportionally adjustable orifice (throttle) 32, an orifice (throttle) 36 is always open. The constant orifice 36 is connected parallel to the proportionally adjustable orifice 32 so that the overall orifice ratio for the system at the connecting site 40 for the pressure compensator 16 is the product of the sum of the two opening cross sections or opening areas.

To be on the safe side, the control spool 62 for the variable orifice 32 is dimensioned such that it is approximately 0.1 mm in front of the assignable row of passage openings 72 in the unenergized state and, in the fully energized state, as viewed in FIG. 2, is 0.1 mm to the left following the row of passage openings 72. This structural design is only exemplary and ensures that, regardless of the production tolerances, the variable orifice 32 can in any case be completely opened or closed. In this respect, defined conditions prevail, and the end values are reliably reached. The permanently open orifice 36 can be implemented in the valve block 58 (FIG. 1) or, as shown in FIG. 2, as a second row of bores 74 which preferably cannot be crossed in its entirety or even partially by the valve spool or control spool 62, depending on the application.

Figure 3:
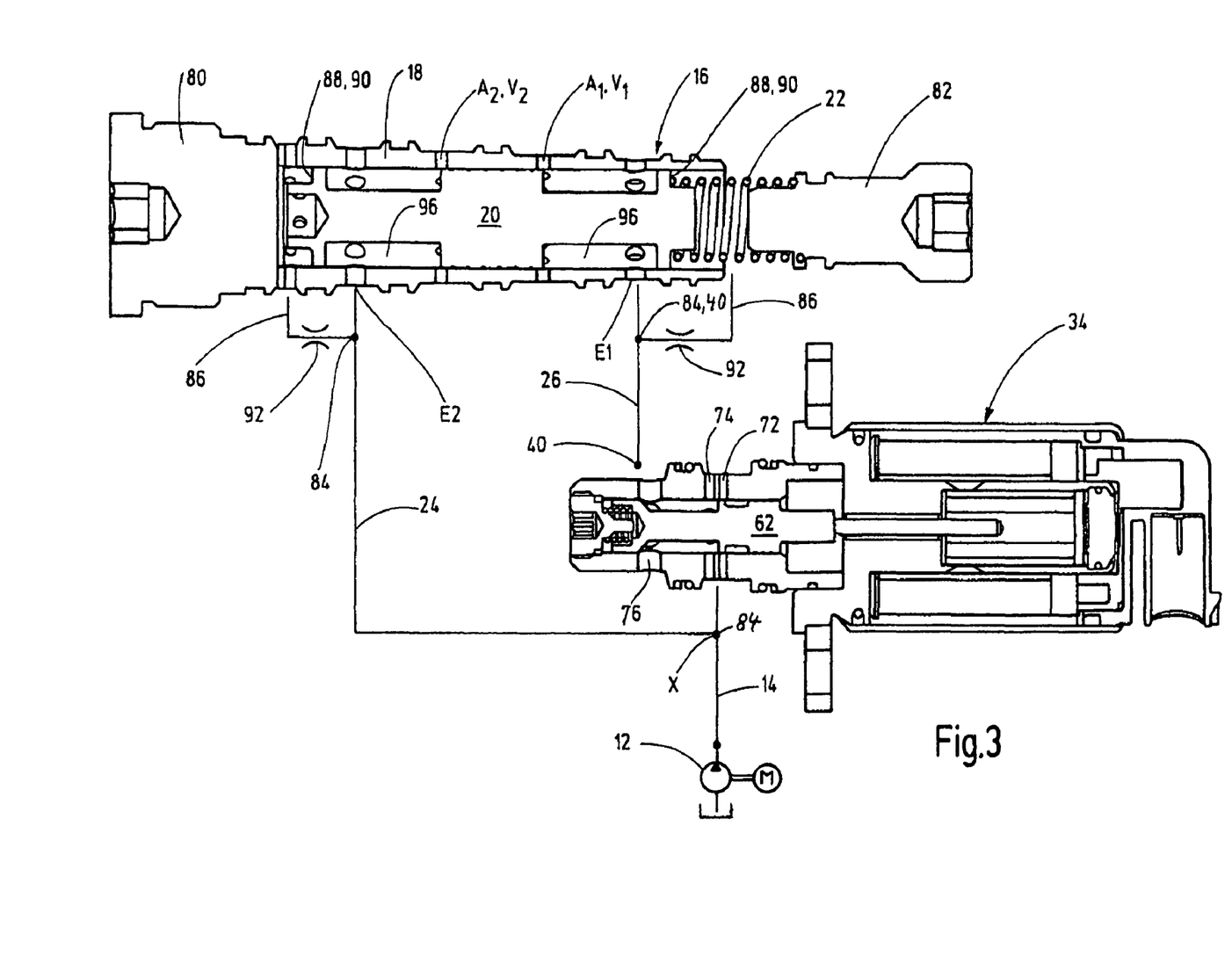
FIG. 3 is a side elevational view in section, without the crosshatching, of a valve device according to a second exemplary embodiment of the present invention with a downstream pressure compensator in addition to a damping means.
Figure 4:
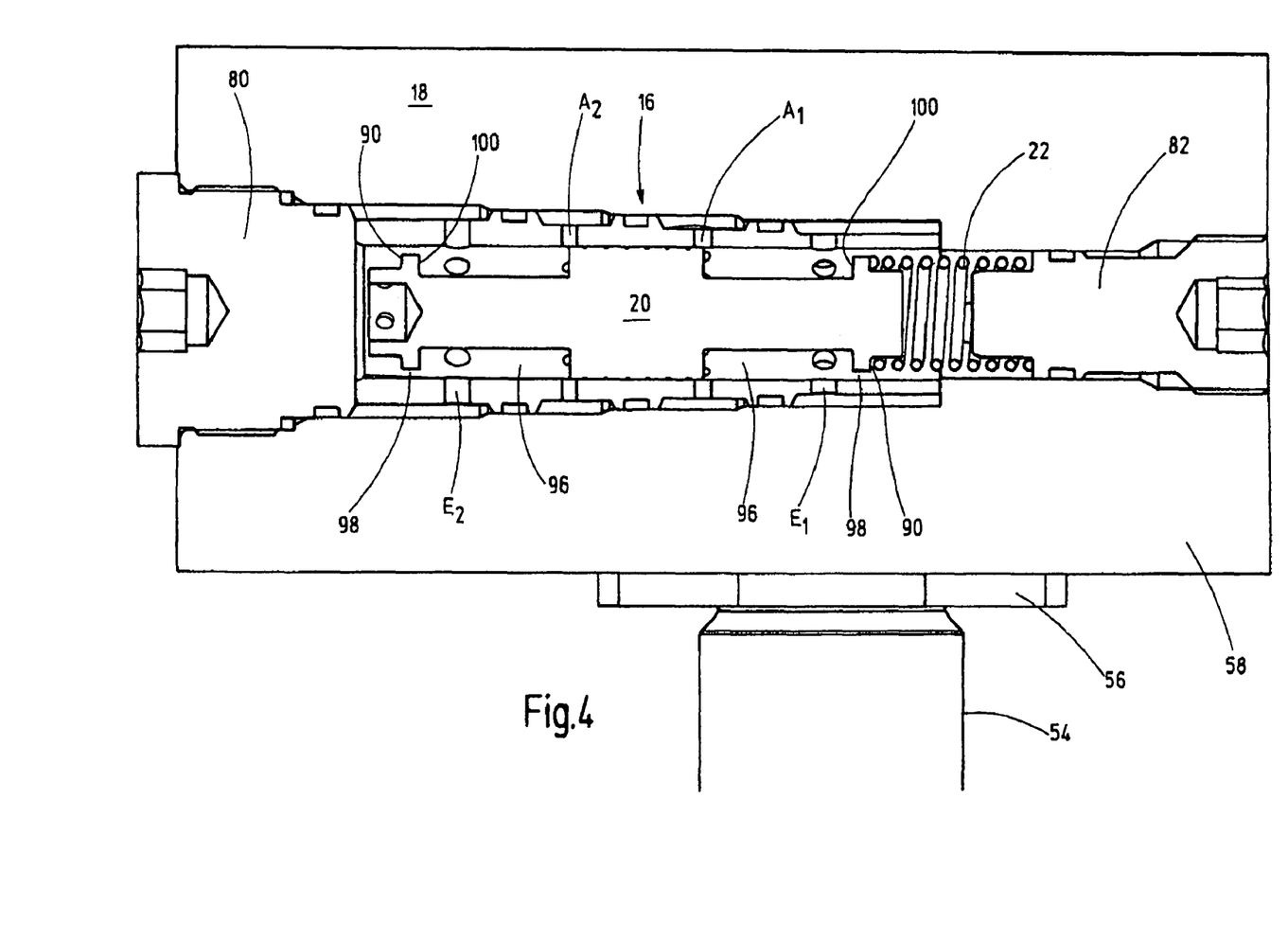
FIG. 4 is a side elevational view in section, without the crosshatching, of the pressure compensator of FIG. 3, but without additional vibration damping.

The variable orifice 32 always interacts with the pressure compensator 16 connected downstream in the fluid direction. This arrangement is detailed in FIG. 3. The pressure compensator 16 is designed as a screw-in cartridge solution, and, as shown in FIG. 4, can be inserted into a valve block 58 (compare the exemplary embodiment as shown in FIG. 5). As viewed in FIG. 3, the compensator on the left side, has a screw-in part 80 and on the opposite right side another screw-in part 82. The other screw-in part 82 in the housing 18 of the pressure compensator 16 also is used to set the spring pretensioning for the adjusting spring 22 since regulation is to take place exactly to a small Δp. In agreement with the basic circuit diagram shown in FIG. 1, on the pressure compensator the individual connections are designated as $E_1$, $E_2$, $A_1$, and $A_2$. Furthermore, in the embodiment as shown in FIG. 3, at one other branch site 84 within the lines 24, 26 in the secondary branch 86, part of the pertinent partial volumetric flow is routed as the control flow $ST_1$, $ST_2$ from the inlet side $E_1$, $E_2$ of the pressure compensator 16 to the assigned end side 88 of the pressure valve spool 20. In this respect the pressure compensator spool 20 in each of its positions of travel has a fluid-tight separation between the inlet sides $E_1$ and $E_2$ to the spool end sides 88 by the spool ring surfaces 90 adjoining the pressure compensator housing 18. One identical damping orifice 92 at a time is connected to the indicated secondary branch 86. With these damping orifices 92 in the bypass, unwanted oscillations in the operation of the pressure compensator 16 can be avoided. The respective damping orifices 92 can also be implemented in the form of damping bores in the pressure compensator housing 18. Providing only one of the two sides of the pressure compensator 16 with damping is also possible.

As depicted in FIG. 3, the pressure compensator spool 20 is shown in its middle actuation position in which it partially overlaps the fluid outlets $A_1$, $A_2$ leading to the hydraulic consumers $V_1$ and $V_2$. The fluid inlets $E_1$ and $E_2$ conversely are left open by the spool 20. By radial recesses 96, a permanent fluid connection is between $E_1$ and $A_1$ and between $E_2$ and $A_2$. The fluid outlets $A_1$, $A_2$ respectively are choked by the pressure compensator spool 20. Depending on the position of travel of the pressure compensator spool 20, the fundamental switching possibilities for the pressure compensator 16 as shown in FIG. 1 are achieved analogously. Since this pressure compensator structure is inherently known, it will not be described further.

The embodiment shown in FIG. 4 has been altered compared to the other embodiment shown in FIG. 3, in that the damping orifices 92 are omitted. The pressure compensator spool 20 in this embodiment in each of its positions of travel has spool ring surfaces 90 spaced apart from the pressure compensator housing 18. Otherwise, in terms of surface ratio, the spool ring surfaces 90 opposite one another correspond to one another for the embodiments shown in FIGS. 3 and 4. For both embodiments the spool 20 is then essentially symmetrical in design. In the modified embodiment shown in FIG. 4, the fluid travels via the inlets $E_1$, $E_2$ as well as the radial recesses 96 and the respective annular gap 98 to the active spool ring surface 90.

The valve block configuration according to FIG. 5 shows that the entire valve device can be combined in one unit. For purposes of a compact arrangement, preferably the proportional magnet 34 projects on the top of the valve block 58 and is fixed there by the flange 56. Then, the valve housing 60 with the different passage sites to the orifice formation 32, 36 projects into the valve block 58. Transversely to this installation arrangement, the pressure compensator 16, as viewed in FIG. 5, extends essentially in the horizontal position between the free end sides of the valve block 58. The screw-in parts 80, 82 form the housing termination to the outside. The important connecting lines P, $A_1$, and $A_2$ then discharge on the side of the valve block 58 facing the viewer of FIG. 5. Other block arrangements are possible.

While various embodiments have been chosen to illustrate the invention, it will be understood by those skilled in the art that various changes and modifications can be made therein without departing from the scope of the invention as defined in the appended claims.

What is claimed is:

1. A valve device for a hydraulic circuit dividing incoming volumetric fluid flow into at least two predetermined partial flows supplying first and second hydraulic consumers of the hydraulic circuit, comprising:
    at least one pressure compensator having a compensator housing with first and second fluid inlets;
    at least one variable passage opening triggerable by a proportional magnet for changing an opening area of said variable passage opening;
    a second passage opening with a constant opening area connected in parallel to said variable passage opening;
    a valve housing coupled to said proportional magnet and having said variable and second passage openings arranged in succession in a direction of travel of a control spool movably mounted in said valve housing and moved by said proportional magnet, said variable and second passage openings in said valve housing being connected in fluid communication to a pressure supply source, a third passage opening in said valve housing being connected in fluid communication to said first fluid inlet of said pressure compensator;
    a first partial flow of the volumetric fluid flow being supplied to said valve housing via said variable and second passage openings at a branch site of the hydraulic circuit; and
    a second partial flow of the volumetric fluid flow being supplied to said second fluid inlet of said pressure compensator at the branch site of the hydraulic circuit.

2. A valve device according to claim 1 wherein said control spool varies at least one free opening area of said variable passage opening.

3. A valve device according to claim 1 wherein
    said pressure compensator has a compensator spool with first and second spool ends, one of said spool ends of said compensator spool being in fluid communication with one of said fluid inlets to route part of one of the partial flows to the respective spool end of said compensator spool at another branch site in a secondary branch of the hydraulic circuit.

4. A valve device according to claim 3 wherein
    said compensator spool moves between travel positions thereof separating said fluid inlets fluid-tight from said spool ends by spool ring surfaces on said compensator spool adjoining said compensator housing; and
    a dampening orifice is connected in the secondary branch.

5. A valve device according to claim 3 wherein
    said compensator spool moves between travel positions thereof to produce a fluid connection between said fluid inlets and said spool ends by spool ring surfaces on said compensator spool spaced apart from said compensator housing.

6. A valve device according to claim 1 wherein said pressure compensator, said passage openings, and said proportional magnet are components of a common valve block.

* * * * *